(12) United States Patent
Suzuki et al.

(10) Patent No.: US 12,457,422 B2
(45) Date of Patent: Oct. 28, 2025

(54) IMAGING APPARATUS WITH GRADATION CORRECTION AND CONTROL METHOD OF IMAGING APPARATUS

(71) Applicant: CANON KABUSHIKI KAISHA, Tokyo (JP)

(72) Inventors: Misaki Suzuki, Kanagawa (JP); Hideki Kadoi, Ibaraki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 185 days.

(21) Appl. No.: 18/351,919

(22) Filed: Jul. 13, 2023

(65) Prior Publication Data

US 2024/0022825 A1     Jan. 18, 2024

(30) Foreign Application Priority Data

Jul. 15, 2022 (JP) .................................. 2022-113709

(51) Int. Cl.
*H04N 23/73* (2023.01)
*H04N 23/71* (2023.01)
*H04N 23/75* (2023.01)

(52) U.S. Cl.
CPC ............. *H04N 23/73* (2023.01); *H04N 23/71* (2023.01)

(58) Field of Classification Search
CPC ........ H04N 23/73; H04N 23/71; H04N 23/60; H04N 23/667; H04N 23/75
See application file for complete search history.

(56) References Cited

U.S. PATENT DOCUMENTS

| | | | |
|---|---|---|---|
| 2007/0188623 A1* | 8/2007 | Yamashita | G06T 5/40 348/222.1 |
| 2010/0271507 A1* | 10/2010 | Hung | H04N 23/71 348/E9.053 |
| 2019/0238737 A1* | 8/2019 | Matsuno | H04N 23/611 |

FOREIGN PATENT DOCUMENTS

| | | |
|---|---|---|
| JP | 11-196292 A | 7/1999 |
| JP | 2015-166767 A | 9/2015 |

* cited by examiner

*Primary Examiner* — Ahmed A Berhan
(74) *Attorney, Agent, or Firm* — Cowan, Liebowitz & Latman, P.C.

(57) ABSTRACT

An imaging apparatus includes at least one memory and at least one processor which function as: an exposure control unit configured to perform exposure control, so that representative brightness of a high brightness region of an image approaches a target brightness that is set by a user; and a gradation correction unit configured to perform gradation correction to increase a contrast of the high brightness region, by expanding a brightness range of the high brightness region of the image which is captured after performing the exposure control, wherein the gradation correction unit changes degree of the expansion of the brightness range of the high brightness region based on the target brightness.

18 Claims, 10 Drawing Sheets

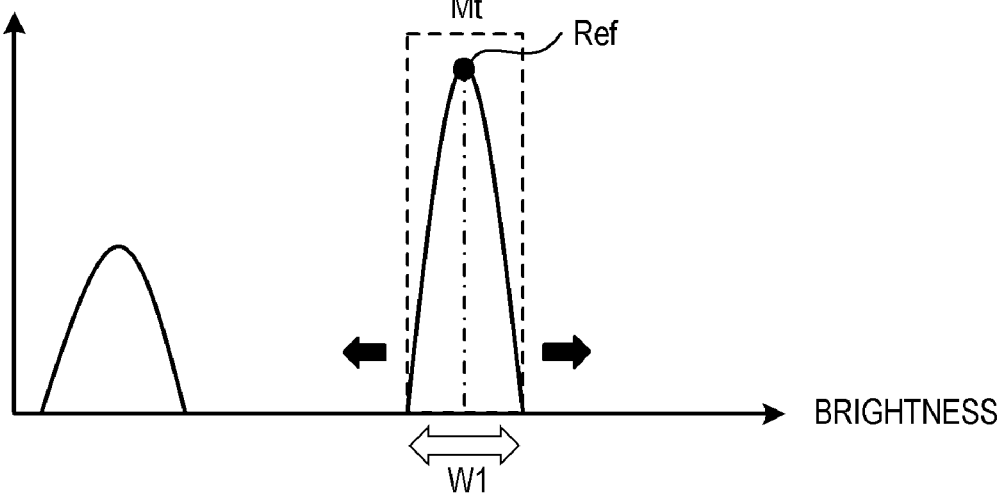
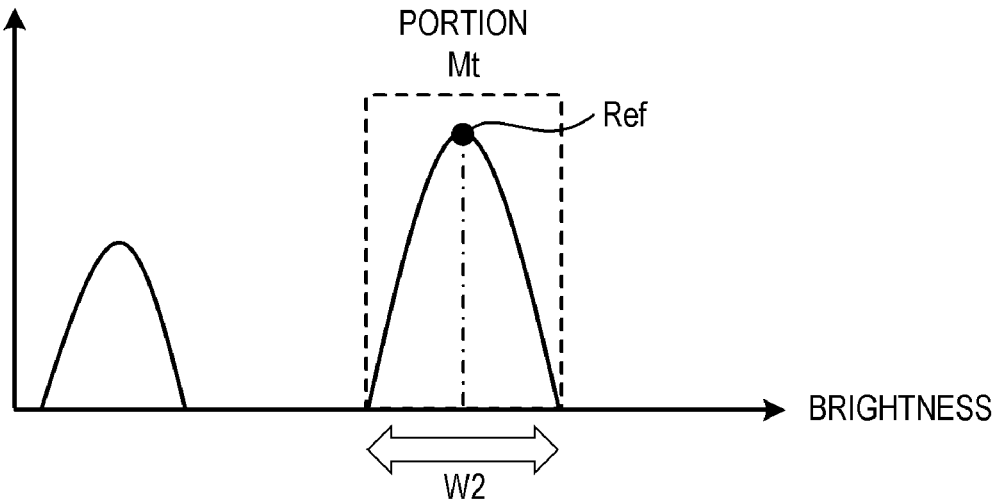

IMAGING APPARATUS WITH GRADATION CORRECTION AND CONTROL METHOD OF IMAGING APPARATUS

BACKGROUND OF THE INVENTION

Field of the Invention

The present invention relates to an imaging apparatus and a control method of the imaging apparatus.

Description of the Related Art

Techniques to perform gradation correction on an image to acquire an image having desirable luminance and contrast are known. Japanese Patent Application Publication No. H11-196292 discloses a technique to perform gradation processing which converts brightness signals, so that a maximum reference brightness detected in an image corresponds to a predetermined brightness signal value.

Further, Japanese Patent Application Publication No. 2015-166767 discloses a technique where, in a case of capturing an image by a highlight-weighted photometry method which performs photometry mainly on a high brightness region of the image, exposure is appropriately controlled in a scene in which a high brightness light exists beside the main object in the image, without being influenced by the high brightness light.

In the highlight-weighted photometry, the exposure is controlled so that the brightness of the high brightness region of the image approaches a target brightness specified by the user, or is not more than the target brightness. As a result, gradation is compressed and in some cases contrast of the image may drop.

For example, it is assumed that in a case of capturing an 8-bit image by the highlight-weighted photometry, the user specifies the target brightness of the high brightness region to 150. Since the exposure is changed such that the brightness of the high brightness region approaches the target brightness 150, the luminance of the image approaches the luminance as the user intended. On the other hand, the gradation is compressed and the contrast of the image decreases if the brightness of the high brightness region approaches the target brightness. In this way, in some cases the contrast of the image may not be as the user intended if priority is assigned to achieving the target luminance. Furthermore, if an image is captured with increasing exposure to increase the contrast of the image, the luminance of the image may not be as the user intended.

SUMMARY OF THE INVENTION

The present invention provides a technique to improve contrast of an image in the high brightness region, while maintaining a luminance intended by the user.

An imaging apparatus according to the present invention includes at least one memory and at least one processor which function as: an exposure control unit configured to perform exposure control, so that representative brightness of a high brightness region of an image approaches a target brightness that is set by a user; and a gradation correction unit configured to perform gradation correction to increase a contrast of the high brightness region, by expanding a brightness range of the high brightness region of the image which is captured after performing the exposure control, wherein the gradation correction unit changes degree of the expansion of the brightness range of the high brightness region based on the target brightness.

Further features of the present invention will become apparent from the following description of exemplary embodiments with reference to the attached drawings.

BRIEF DESCRIPTION OF THE DRAWINGS

FIG. 7A is an example of a histogram before expanding a mountain portion;

FIG. 7B is an example of a histogram after expanding the mountain portion;

DESCRIPTION OF THE EMBODIMENTS

Embodiments of the present invention will be described with reference to the drawings. Embodiments to be described below are examples of implementing the present invention, and may be modified or changed when necessary, depending on the configuration and various conditions of the apparatus to which the present invention is applied. Each of the embodiments may be combined when necessary.

Configuration of Digital Camera

Figure 1:
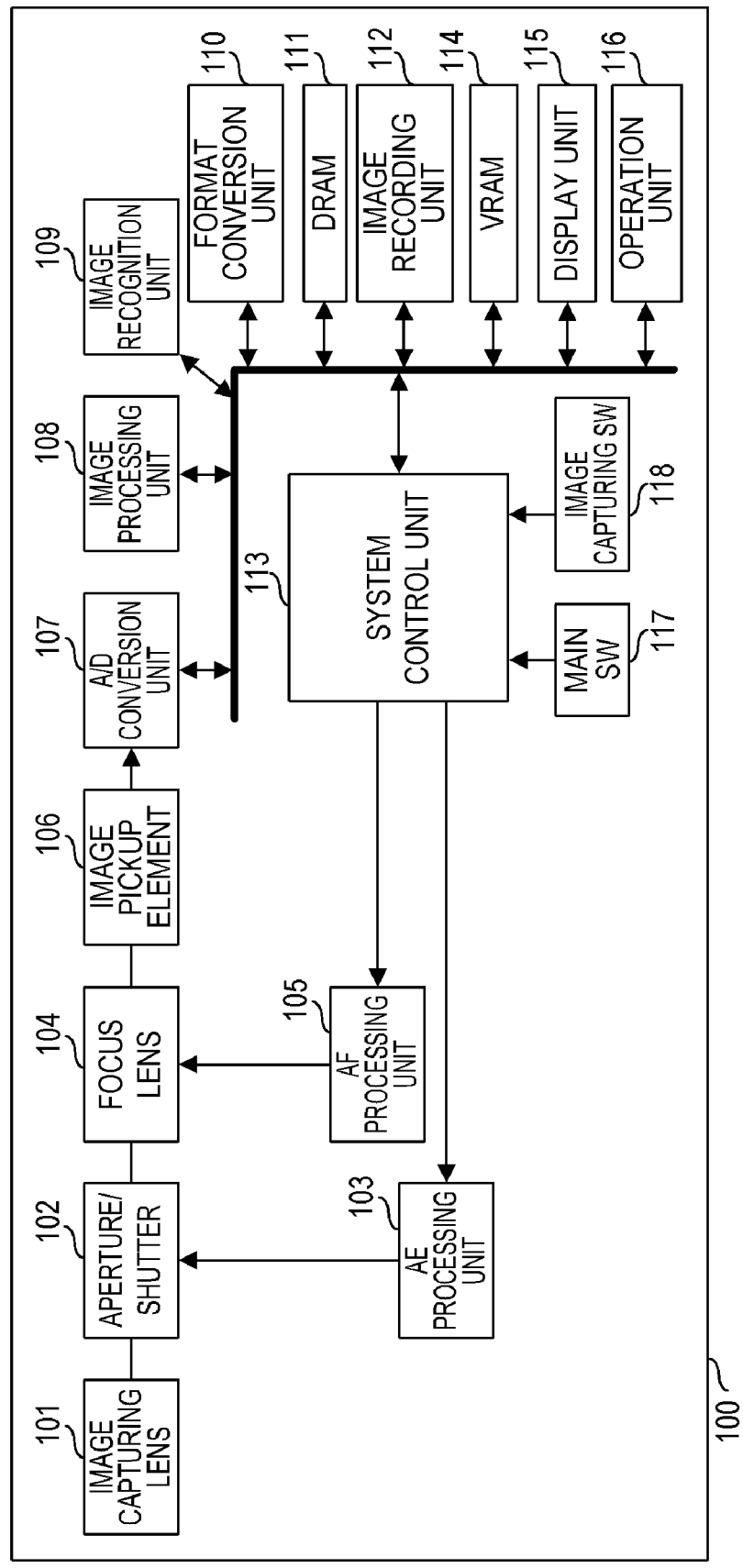
FIG. 1 is a block diagram exemplifying a configuration of a digital camera.

FIG. 1 is a block diagram exemplifying a configuration of a digital camera 100, which is an imaging apparatus according to an embodiment of the present invention. As an imaging mechanism, the digital camera 100 includes: an image capturing lens 101, an aperture/shutter 102, an automatic exposure (AE) processing unit 103, a focus lens 104, an autofocus (AF) processing unit 105, an image pickup element 106, and an A/D conversion unit 107.

The image capturing lens 101 includes a zoom mechanism. The aperture/shutter 102 controls the light quantity of the incident light (reflected light from an object) to the image pickup element 106, and the charge storage time, in accordance with the instruction from the AE processing unit 103. The AE processing unit 103 performs photometry for a photometry region in accordance with the photometry mode, and controls exposure by controlling the operation of the aperture/shutter 102. The AE processing unit 103 also controls the A/D conversion unit 107. The focus lens 104 forms an optical image focusing on a light-receiving surface of the image pickup element 106 in accordance with a control signal from the AF processing unit 105. The AF processing unit 105 calculates distance from the digital camera 100 to the object.

The image pickup element 106 converts the optical image formed on the light-receiving surface into electric signals using such photoelectric conversion unit as a CCD element or a CMOS element, and outputs the electric signals to the A/D conversion unit 107. The A/D conversion unit 107 converts the received electric signals (analog signals) into digital signals (RAW signals). The A/D conversion unit 107 includes a CDS circuit that removes noise from the received electric signals, and a non-linear amplification circuit to perform non-linear amplification on the received electric signals before converting the electric signals into the RAW signals.

The digital camera 100 also includes an image processing unit 108, an image recognition unit 109, a format conversion unit 110, and a dynamic RAM (DRAM) 111. The image processing unit 108 performs developing processing, where a predetermined pixel interpolation, resize processing (e.g. demagnifying an image), and color conversion processing are performed on the RAW signals inputted from the A/D conversion unit 107, and the image data is outputted.

The image processing unit 108 adjusts white balance (WB) for the RAW signals inputted from the A/D conversion unit 107, and adjusts the image quality of the captured image by performing the gradation correction (e.g. by increasing/decreasing the brightness level of the image). For example, for the brightness level of the image data, the image processing unit 108 has a function to increase/decrease a brightness level of an entire image at a uniform amplification ratio, and has a tone curve (gamma) function to convert a signal level in accordance with the magnitude of the original signal level. The image processing unit 108 implements the gradation correction processing by these functions.

The image recognition unit 109 receives input of the image data which has been processed appropriately by the image processing unit 108. The image recognition unit 109 can recognize the state of the luminance of the inputted image as the photometry processing. The image recognition unit 109 divides the image data into a plurality of regions, and performs the photometry. Therefore, the image recognition unit 109 can determine a high brightness region in the image, and acquire the photometry result in the high brightness region.

The high brightness region may be, for example, a brightness range corresponding to a mountain portion (peak portion) on the higher brightness side of the brightness histogram of the image. The brightness range corresponding to the mountain portion on the higher brightness side may be a range from a minimum value (inflection point) on the lower brightness side of the peak of the mountain portion to a minimum value (inflection point) on the higher brightness side of the peak of the mountain portion, or may be a range specified by the user.

The image recognition unit 109 can recognize a scene using a known technique. For example, in a case where a face of a person is detected, the image recognition unit 109 recognizes that this is a scene of capturing an image of a person. The photometry result and the information on the recognition of the scene by the image recognition unit 109 are outputted to the AE processing unit 103.

The user can select a photometry mode using the operation unit 116. The operation unit 116 outputs the photometry mode selected by the user to the AE processing unit 103. The AE processing unit 103 performs automatic exposure based on the photometry result and the information on the recognition of the scene outputted by the image recognition unit 109, and the information on the photometry mode and the like outputted by the operation unit 116.

Further, the image recognition unit 109 can recognize the focusing state of the inputted image. The recognition result of the focusing state is outputted to the AF processing unit 105. The AF processing unit 105 implements the AF control based on the recognition result of the focusing state.

The format conversion unit 110 converts the format of the image data generated by the image processing unit 108 in order to store the image data to the DRAM 111. The DRAM 111 is an internal memory, and is used as a buffer to temporarily store image data, or as a work memory to perform compression/decompression processing of the image data, for example.

The digital camera 100 includes: an image recording unit 112, a system control unit 113, a video RAM (VRAM) 114, a display unit 115, an operation unit 116, a main switch (main SW) 117, and an image capturing switch (image capturing SW) 118. The image recording unit 112 includes a recording medium, such as a memory card, to record captured images (still images, moving images) and an interface thereof.

The system control unit 113 includes a CPU (processor), a ROM and a RAM. The CPU controls the general operation of the digital camera 100 by developing the programs stored in the ROM in the work area of the RAM, and executing the programs. The system control unit 113 can implement the processing of each component of the digital camera 100 by executing the programs stored in the ROM. The system control unit 113 controls which mode is selected, out of the plurality of imaging driving modes of the image pickup element 106. The VRAM 114 is a memory for image display.

Figure 2A:
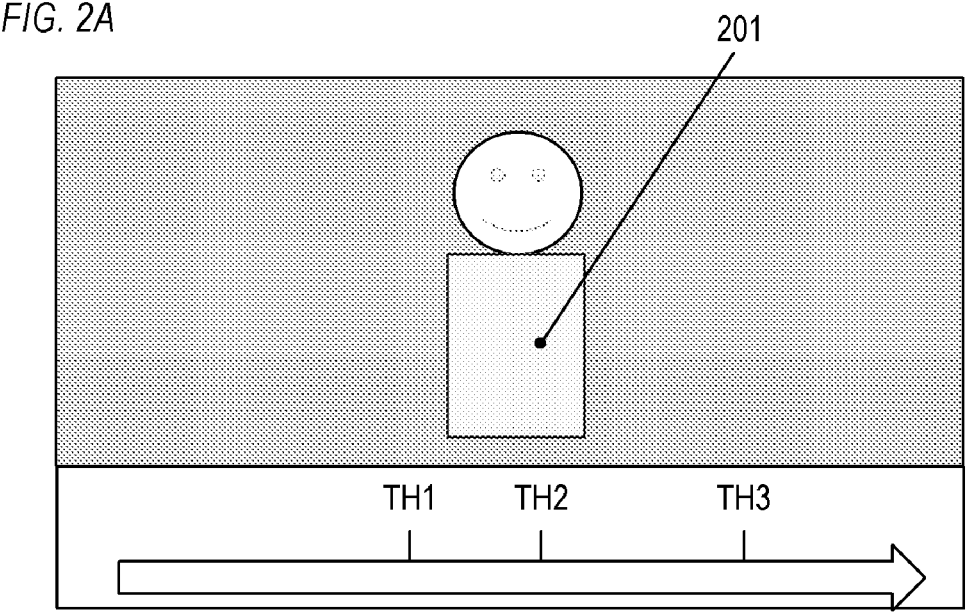
FIGS. 2A and 2B are screen examples for a user to select a target brightness of a high brightness region.
Figure 2B:
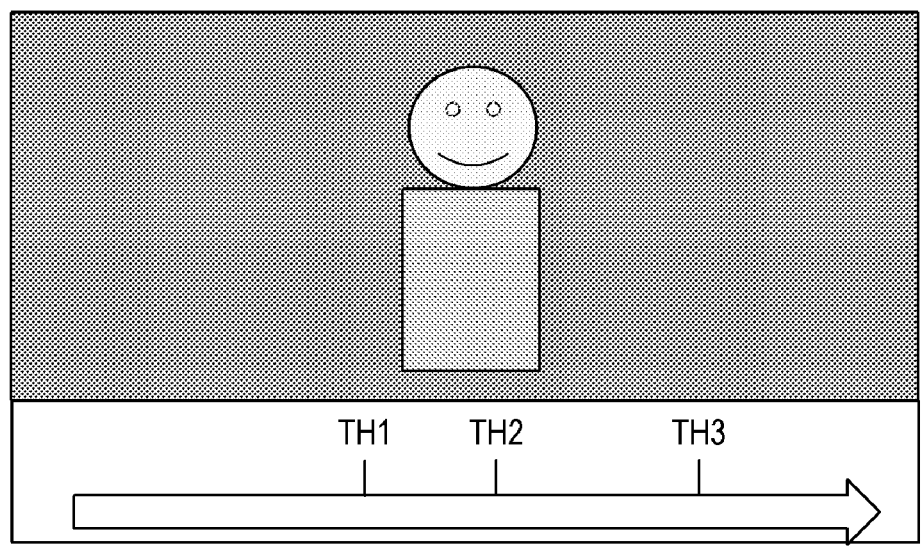

The display unit 115 is a liquid crystal display (LCD), for example. The display unit 115 displays an image, displays information to assist operation, and displays the state of the digital camera 100, and when an image is captured, the display unit 115 also displays the image capturing screen and a distance measurement area. Further, as illustrated in FIGS. 2A and 2B, the display unit 115 displays a screen for the user to select a target brightness of the high brightness region.

The operation unit 116 is a member for the user to operate the digital camera 100 externally. Using the operation unit 116, the user can perform various settings, such as settings for exposure correction, aperture value and image reproduction. The operation unit 116 includes a menu switch, a zoom lever to instruct zoom operation of the image capturing lens, and an operation mode selecting switch to switch between an image capturing mode and a reproduction mode.

The user can select a photometry mode by operating the operation unit 116. The photometry modes that the user can select are an evaluation photometry mode, a partial photometry mode, and a highlight-weighted photometry mode, for example.

The evaluation photometry mode is a mode in which photometry is performed for each of a plurality of regions that are set on the screen, and a final exposure is determined based on information on the object, such as a brightness distribution, a color, a distance and a composition. The evaluation photometry mode is appropriate for standard image capturing, including backlight image capturing. The partial photometry mode is a mode in which photometry is performed for a center region of the screen. The partial photometry mode is effective in a case where there is strong light around the object due to backlight or the like. The highlight-weighted photometry mode is a mode in which the exposure is determined mainly for the high brightness region on the screen to have an optimum luminance. In the highlight-weighted photometry mode, a target photometry region, where photometry is mainly performed, is the high brightness region. Generally, if the exposure control is performed such that the high brightness region on the screen has an optimum luminance, exposure is darker in the highlight-weighted photometry mode than in the evaluation photometry mode.

The user can select a target brightness TH of the high brightness region by operating the operation unit 116 on the screens indicated in FIGS. 2A and 2B. The target brightness TH of the high brightness region selected by the user is outputted to the AE processing unit 103 to be used for controlling the exposure, and is outputted to the image processing unit 108 to be used for controlling the image processing.

The main switch 117 is a switch to turn the power of the digital camera 100 ON. The image capturing switch 118 is a switch to perform a two-step operation in accordance with the pushing depth of the switch. By a half depressing operation (SW1 operation), where the image capturing switch 118 is pushed in half way, the system control unit 113 executes an image capturing preparation operation, such as AE processing and AF processing. By fully depressing operation (SW2 operation), where the image capturing switch 118 is completely pushed in, the system control unit 113 executes the image capturing processing.

A series of processing executed by the digital camera 100 will be described. When power is turned ON by pressing the main switch 117, the system control unit 113 of the digital camera 100 executes the imaging processing at a predetermined cycle (e.g. 33 ms cycle) using the image pickup element 106. The digital camera 100 then enters a main image capturing standby state, where captured images are sequentially displayed on the display unit 115. When an image capturing instruction, performed by pressing the image capturing switch 118 (SW2 operation), is received, the system control unit 113 executes the main image capturing processing using the image pickup element 106. The system control unit 113 executes the image processing on the captured image using the image processing unit 108, and records the image data after the image processing in the image recording unit 112. Then the digital camera 100 returns to the main image capturing standby state. When the main switch 117 is pressed again, power of the digital camera 100 is shut OFF.

FIGS. 2A and 2B are screen examples for the user to select a target brightness for the brightness of the high brightness region. The brightness of the high brightness region is a representative brightness determined based on the brightness values of the pixels included in the high brightness region (hereafter also called "representative brightness"). For example, the representative brightness may be an average value, a maximum value, a minimum value, a median value or a mode value of the brightness values of the pixels included in the high brightness region. The target brightness is a target value to determine the level of the brightness of the high brightness region when an image is captured.

In the screen in FIG. 2A, the user selects one of TH1, TH2 and TH3 (TH1<TH2<TH3) as the target brightness of the highlight portion (high brightness region). For example, in an 8-bit image, TH1 is 120, TH2 is 150 and TH3 is 200.

FIG. 2A is an example in a case where TH3 is specified as the target brightness. If an image of a highlight portion 201 (an object) is captured at a luminance higher than the intended luminance, the user re-selects the target brightness TH in the sequence of TH3→TH2→TH1 to darken the object. FIG. 2B is an example in a case where TH1 is specified as the target brightness. The user can darken the image by decreasing the target brightness, whereby the gradation of the object can be appropriate.

TH1, TH2 and TH3 may be the brightness values determined in advance, and may be changeable by the user. The user interface, to set the target brightness, is not limited to the example of FIGS. 2A and 2B. The target brightness may be set by the user inputting a brightness value.

Flow of Image Capturing Processing by Highlight-Weighted Photometry

Figure 3:
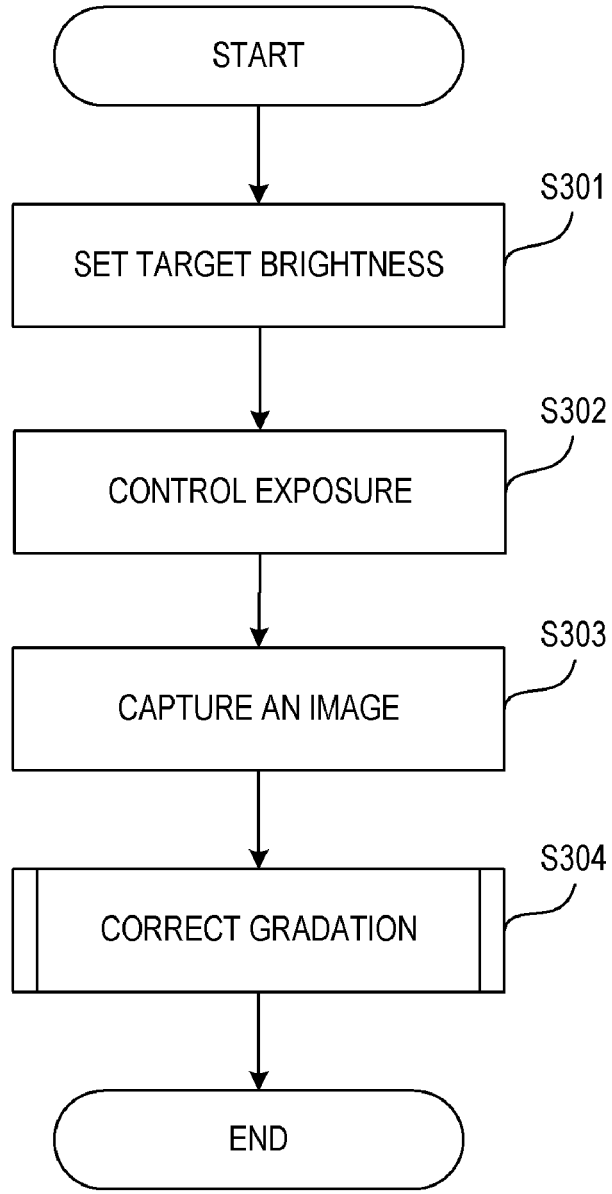
FIG. 3 is a flow chart exemplifying image capturing processing by highlight-weighted photometry.

The flow of the image capturing by the highlight-weighted photometry executed by the digital camera 100 will be described with reference to FIG. 3. FIG. 3 is a flow chart exemplifying the image capturing processing by the highlight-weighted photometry.

In step S301, the system control unit 113 sets a target brightness of a highlight portion. The highlight portion is a high brightness region in an image. The target brightness is a target value to determine the brightness used for the highlight portion when an image is captured. The system control unit 113 can set the target brightness on the screen of FIG. 2A or FIG. 2B displayed on the display unit 115, based on the instruction from the user (e.g. selection operation, input operation) via the operation unit 116.

In step S302, the system control unit 113 performs the exposure control by the highlight-weighted photometry. The system control unit 113 converts the target brightness which was set in step S301 into a signal value before the A/D conversion using the image processing unit 108, and transfers the converted signal value to the AE processing unit 103. Further, the system control unit 113 measures the brightness of the highlight portion using the image processing unit 108 and the image recognition unit 109. The system control unit 113 further converts the brightness of the highlight portion into a signal value before the A/D conversion using the image processing unit 108, and transfers the converted signal value to the AE processing unit 103. The AE processing unit 103 determines the exposure step difference between the target brightness and the brightness of the highlight portion, and determines the exposure by controlling the operation of the aperture/shutter 102.

In step S303, the system control unit 113 captures an image. The system control unit 113 executes the main image capturing processing using the image pickup element 106. In step S304, the system control unit 113 performs gradation correction. The system control unit 113 performs the gradation correction on the image captured in step S303 using the image processing unit 108.

Flow of Gradation Correction

The gradation correction processing in step S304 in FIG. 3 will be described in detail with reference to FIG. 4. In step S401, the image processing unit 108 generates a histogram (brightness histogram) on the image. The image processing unit 108 detects a brightness of the image data captured in step S303 in FIG. 3, and generates a histogram thereof. FIG. 5 is an example of the generated histogram. The abscissa indicates the brightness, and the ordinate indicates a number of pixels having the brightness indicated by the abscissa. In an 8-bit image, the brightness indicated by the abscissa is 0 to 255.

The range in which the brightness is detected when a histogram is generated includes entire image data, but may be a region excluding the periphery (edge portions) of the image. The reason why the histogram is generated for the region excluding the periphery of the image is because the brightness tends to drop in the peripheral region of the image, due to the decrease of the peripheral light quantity of the lens. In the peripheral region of an image, the brightness is shifted on the lower brightness side and cannot be detected appropriately in some cases, hence it is preferable that the histogram is generated based on the region excluding the periphery of the image. Further, it is possible that no object exists in the peripheral region of an image, and the user does not gaze at this region if no object exists, therefore not including the peripheral region in the detection range is preferable.

In step S402, the image processing unit 108 acquires the characteristic values of the histogram. The characteristic values of the histogram will be described with reference to FIG. 5. The characteristic values of the histogram are values to indicate a characteristic of a mountain portion Mt on the higher brightness side of the histogram. The characteristic values of the histogram include a start position Ms of the mountain portion Mt, an end position Me of the mountain portion Mt, and a position of a reference point Ref which is a reference of the mountain portion Mt. The image processing unit 108 controls so that the brightness at the reference point Ref is not changed by the gradation correction. The brightness at the reference point Ref is also called a "reference brightness".

In the histogram generated in step S401, the image processing unit 108 acquires the mountain portion Mt on the higher brightness side as a high brightness region. The mountain portion Mt is acquired, for example, by searching the histogram from the higher brightness side, and determining a portion that includes a range where a number of pixels increase continuously for at least a predetermined threshold, and a range where a number of pixels decreases continuously for at least a predetermined threshold.

The start position Ms of the mountain portion Mt, for example, is a position at which a number of pixels on the lower brightness side of the mountain changes from descending to ascending when the histogram is searched from the higher brightness side. The end position Me of the mountain portion Mt, for example, is a position at which a number of pixels on the higher brightness side of the mountain starts to increase when the histogram is searched from the higher brightness side. The mountain portion Mt may be acquired by other methods. For example, the mountain portion Mt may be a portion (brightness range) where a number of pixels is at least a predetermined number, out of the mountain of the histogram on the higher brightness side.

The image processing unit 108 also sets the reference point Ref which is a point at which the luminance is not changed in the image, within the brightness range of the mountain portion Mt. In FIG. 5, the reference point Ref is set at a position of the peak (maximum value) of the mountain portion Mt. The reference point Ref is not limited to the position of the peak of the mountain portion Mt, and may be a center-of-gravity position of a region corresponding to the mountain portion Mt of the histogram. The region corresponding to the mountain portion Mt, for example, is a region enclosed by the histogram of the mountain portion Mt, the abscissa (brightness), the line parallel with the ordinate at the start position Ms, and the line parallel with the ordinate at the end position Me. The reference point Ref may be a position of the representative brightness of the high brightness region, such as a position at the average brightness of the brightness of the mountain portion Mt.

The characteristic values of the histogram to specify the mountain portion Mt may be specified by the user via the operation unit 116. The user can specify the mountain portion Mt by selecting the range of the mountain portion Mt in the histogram, or by specifying the start position Ms, the end position Me, and the reference point Ref.

In step S403, the image processing unit 108 determines a correction target value. The correction target value is a width (extent) of the brightness range of the high brightness region after expanding the higher brightness region in the histogram in the abscissa (brightness) direction, in order to increase the contrast of the high brightness region.

In the highlight-weighted photometry mode, the contrast of the high brightness region (mountain portion Mt) may drop in some cases, since the gradation of the image is compressed. Therefore, the image processing unit 108 expands the mountain portion Mt in the histogram in the abscissa direction, so as to increase the contrast of the high brightness region. The image processing unit 108 determines how much the mountain portion Mt on the higher brightness side in the histogram generated in step S402 is expanded in the abscissa direction. In other words, the image processing unit 108 determines the width after expanding the mountain portion Mt as the correction target value. Based on the determined correction target value, the image processing unit 108 determines the start position and the end position of the expanded mountain portion Mt after the expansion.

The correction target value, which is the width of the expanded mountain portion Mt after the expansion (width of expanded brightness range (reference brightness range)), is predetermined in a lookup table in accordance with the width of the brightness range of the high brightness region before the expansion, for example. FIG. 6 is an example of the lookup table to determine the width of the mountain portion Mt in the histogram. The lookup table in FIG. 6 corresponds the width of the mountain portion Mt before the expansion and the width after the expansion.

In the case where the width of the mountain portion Mt before the expansion is count in an 8-bit image, it is likely that the gradation is compressed and the contrast dropped thereby, hence the width after the expansion is set to 30 count in the lookup table in FIG. 6. In the case where the width of the mountain portion Mt before the expansion is 50 count, on the other hand, gradation is sufficiently wide, hence the width after the expansion is unchanged at 50 count, and the histogram is not expanded.

The histograms before and after expanding the mountain portion Mt will be described with reference to FIGS. 7A and 7B. FIG. 7A is an example of the histogram before the expansion, and FIG. 7B is an example of the histogram after the expansion. The width of the mountain portion Mt is expanded such that the brightness at the reference point Ref (reference brightness) does not change. The width W1 of the mountain portion Mt before the expansion has been expanded to W2 in the histogram after the expansion, with keeping the reference point Ref at the center of the mountain portion Mt.

Determination of the width W2 of the mountain portion Mt after the expansion (width of the expanded brightness range) is not limited to determination with reference to the lookup table, but may be a determination using a function (expanding width determination function) which uniquely determines the ratio of change in accordance with the width of the mountain portion Mt before the expansion. When the width of the mountain portion Mt before the expansion is W1 and the expanding width determination function is Rate (W1) (≥1), the width W2 of the mountain portion Mt after the expansion is given by (Formula 1) below.

$$W2 = \text{Rate}(W1) \times W1 \quad \text{(Formula 1)}$$

Whether or not the mountain portion is expanded may be determined by a threshold that is set in advance for the width of the mountain portion Mt. For example, if the width of the mountain portion Mt is at least the threshold, the image processing unit 108 determines that the width of the mountain portion Mt is not expanded. The threshold to determine whether or not the mountain portion is expanded may be a unique value, or may be changed in accordance with the target brightness TH of the highlight portion specified by the user in step S301. For example, in the case where the target brightness is TH1, the target brightness is compressed more than the case where the target brightness is TH3, hence the threshold in the case where the target brightness is TH1 may be smaller than the threshold in the case where the target brightness is TH3.

The image processing unit 108 may determine not to expand the width of the mountain portion Mt regardless the width of the mountain portion Mt, if a cumulative number of pixels or a ratio of a cumulative number of pixels, included in the mountain portion Mt, is not more than a threshold. For example, if the ratio of a cumulative number of pixels in the mountain portion Mt, with respect to the total number of pixels, is not more than 5%, the image processing unit 108 may determine not to expand the width of the mountain portion Mt.

In the case of expanding the width of the mountain portion Mt, the image processing unit 108 may expand the width such that the brightness at the end position Me after the expansion (maximum brightness in the brightness range of the mountain portion Mt) does not exceed the target brightness TH. The image processing unit 108 may also change the degree of expansion of the mountain portion Mt based on the relationship between the target brightness TH and the reference point Ref, which was determined and set in step S402. For example, in the case where the difference between the target brightness TH and the brightness at the reference point Ref is not more than a predetermined threshold (e.g. 10 count), the image processing unit 108 can reduce the degree of expanding the mountain portion Mt by making Rate (W1) in (Formula 1) closer to 1. The gradation correction is weakened by reducing the degree of expansion. Here reducing the degree of expansion includes the case of not expanding the width of the mountain portion Mt setting Rate (W1) to 1.

The start position Ms and the end position Me of the mountain portion Mt after the expansion are determined, for example, based on the width of the mountain portion Mt after expansion (corrected target value) and the position of the reference point Ref. When it is assumed that the lower brightness side is on the left and the higher brightness side is on the right, the start position Ms and the end position Me are determined to be bilaterally symmetrical with respect to the brightness at the reference point Ref, for example. In other words, the brightness at the start position Ms (minimum brightness) after the expansion and the brightness at the end position Me (maximum brightness) after the expansion are determined such that the brightness at the reference point Ref (reference brightness) is a mid-point between the start point Ms and the end point Me.

Further, by changing the degree of expansion between the lower brightness side and the higher brightness side of the reference point Ref of the mountain portion Mt, using different weighting values, the start position Ms and the end position Me may be determined to be bilaterally asymmetric (lower brightness side is on the left, and higher brightness side is on the right). In other words, the brightness of the start position Ms (minimum brightness) after the expansion and the brightness of the end position Me (maximum brightness) after the expansion are determined such that the respective differences from the brightness at the reference point Ref (reference brightness) are different from each other. The image processing unit 108 may more strongly expand one of the lower brightness side and the higher brightness side in the mountain portion Mt, or may not expand one of them.

The image processing unit 108 may also determine the start position Ms and the end position Me based on the target brightness TH. For example, the image processing unit 108 may set such that the end position Me of the mountain portion Mt matches with the target brightness TH, and determine the start position Ms such that the width of the mountain portion Mt after the expansion approaches the correction target value.

In step S404, the image processing unit 108 determines a tone curve based on the correction target value determined in step S403. Specifically, the image processing unit 108 determines a control point to change the shape of the tone curve and a correction amount of the output brightness at the control point. In the following description, it is assumed that the reference point acquired in step S402 is Ref, and the start position of the mountain portion Mt before the expansion is Ms1, and the end position thereof is Me1. It is also assumed that the start position of the mountain portion Mt after the expansion determined in step S403 is Ms2, and the end position thereof is Me2.

Figure 8A:
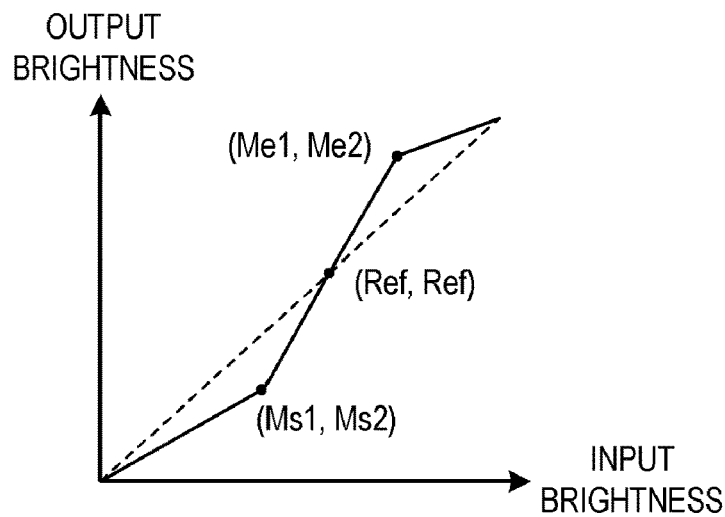
FIGS. 8A to 8C are examples of tone curves corresponding to the histogram after expanding the mountain portion.

The tone curves corresponding to the histogram of the mountain portion Mt after the expansion will be described with reference to FIGS. 8A to 8C. The abscissa of the tone curve indicates the input brightness, and the ordinate thereof indicates the output brightness. FIG. 8A is an example of a polygonal line type tone curve connecting three control points of the start position (Ms1, Ms2), the reference point (Ref, Ref), and the end position (Me1, Me2) of the mountain portion Mt.

Figure 8B:
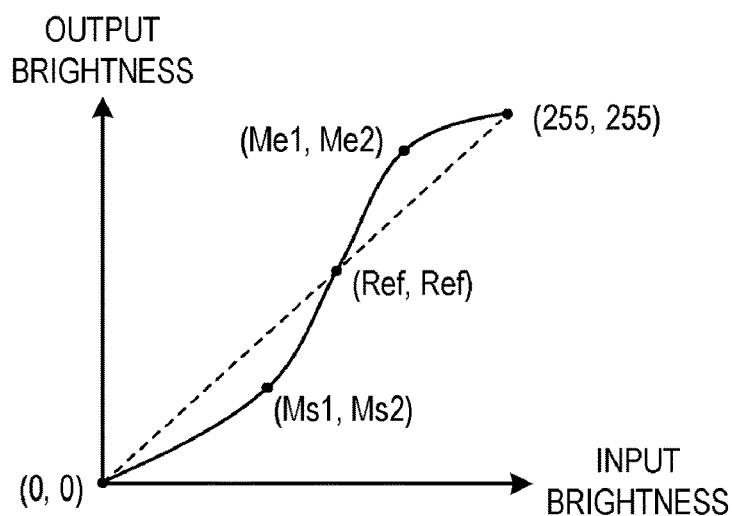

FIG. 8B is an example of a curved line type tone curve generated by performing spline interpolation, so as to connect (0, 0), (Ms1, Ms2), (Ref, Ref), (Me1, Me2) and (255, 255). The tone curve is determined to increase monotonically, so that gradation inversion does not occur.

Figure 8C:
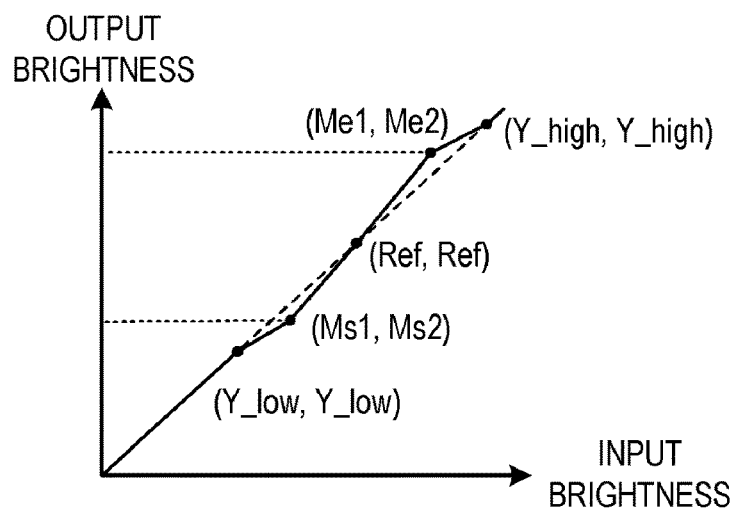

FIG. 8C is an example of a polygonal line type tone curve when control points at which luminance is not changed are added in addition to the reference point Ref. The control points to be added, for example, are a point on the lower brightness side of the start position Ms2 of the mountain portion Mt after the expansion, that is, (Y_low, Y_low), and a point on the higher brightness side of the end position Me2 of the mountain portion Mt after the expansion, that is, (Y_high, Y_high). By adding the control points, the gradation from 0 to Y_low, and the gradation from Y_high to 255, out of the brightness range other than the mountain portion Mt, can be maintained.

Y_low may be set on the lower brightness side of the start position Ms2 of the mountain portion Mt after the expansion. Further, a mountain portion of the histogram on the lower brightness side is detected, and Y_low may be set on the lower brightness side of the detected mountain portion.

Y_high is set on the higher brightness side of the end position Me2 of the mountain portion Mt after the expansion. Y_high may be set in accordance with the target brightness TH, and may be the same as the target brightness TH or may be set to a brightness that is higher than the target brightness TH by a predetermined count.

In step S405, the image processing unit 108 applies the tone curve determined in step S404 to the image. The tone curve determined in step S404 is a function, f: x→y (0≤x, y≤255, in the case of an 8-bit image), that corresponds to the brightness value y of the output to the brightness value x of the input. The image processing unit 108 converts the gradation of the image using the function f.

Correction Target Value

Figure 4:
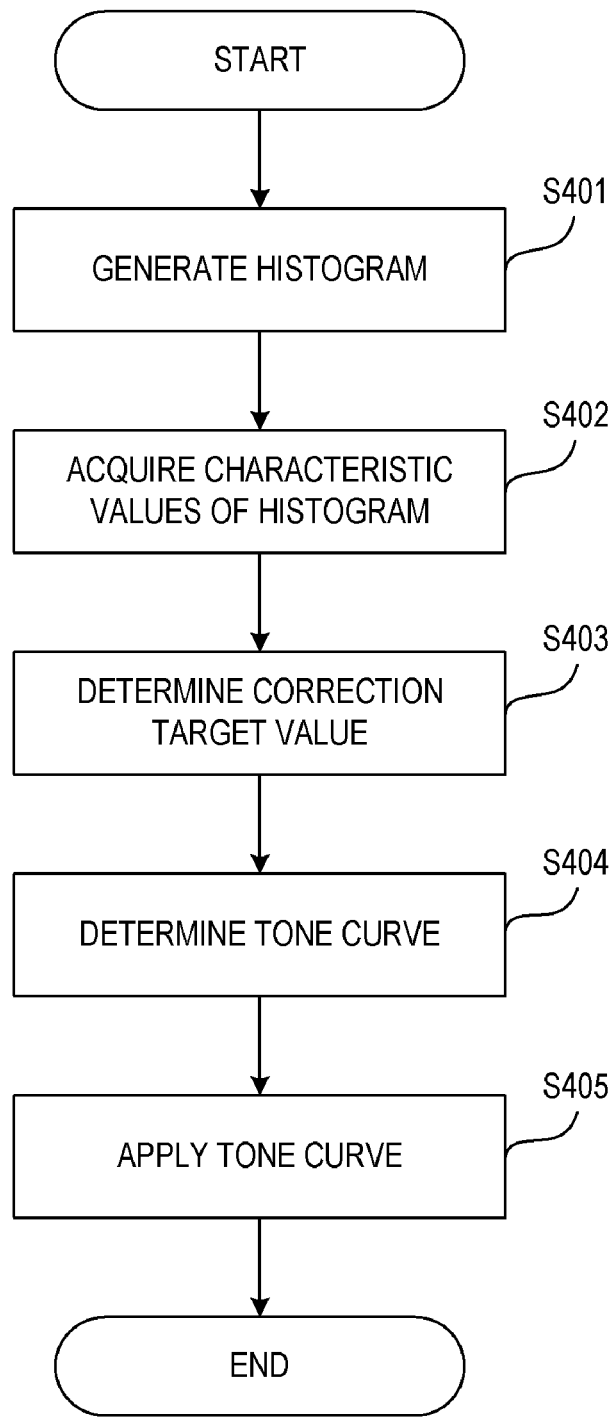
FIG. 4 is a flow chart exemplifying gradation correction processing.
Figures 5, 6:
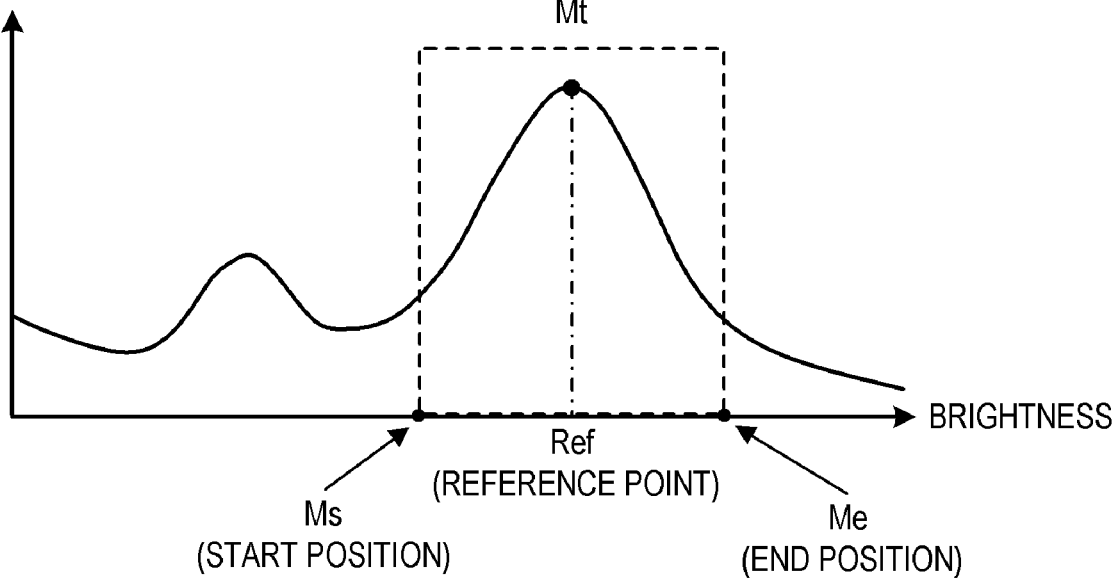
FIG. 5 is a diagram exemplifying a histogram of an image.
FIG. 6 is an example of a lookup table to determine a width of a mountain portion of a histogram.

The correction target value is determined by the method described in step S403 in FIG. 4, but may be further changed considering the target brightness TH or the brightness of the main object. Two modifications of the determination method for the correction target value will be described with reference to FIGS. 9A to 11B.

Determination Method 1 for Correction Target Value

A determination method 1 for the correction target value is a method of changing an expansion ratio (degree of expansion) of the width of the mountain portion Mt considering the target brightness TH. In the highlight-weighted photometry, in which the user can select the target brightness TH of the highlight portion, the contrast will drop if the user selects TH1 as the target brightness TH, compared with selecting TH3, which is brighter than TH1.

If the same correction target value is used in the case where the target brightness TH is TH1 and in the case where it is TH3, the contrast may be improved in the case where the target brightness TH is TH3, but in the case where the target brightness TH is TH1, the expansion may not be sufficient, and contrast may not be increased as intended by the user. In the determination method 1, the image processing unit 108 changes the expansion ratio of the histogram based on the target brightness TH selected by the user, and thereby determines the correction target value. The image processing unit 108 can adjust the contrast in accordance with the target brightness TH by increasing the expansion ratio of the mountain portion Mt of the histogram as the target brightness TH is lower.

Determination of the correction target value in accordance with the target brightness TH will be described specifically with reference to FIGS. 9A and 9B. The correction target value is changed using the expansion ratio in accordance with the target brightness TH. In the following example, the determination method for the correction target value will be described for cases where the target brightness TH is 200 and 150 (both 8-bit images).

Figure 9A:
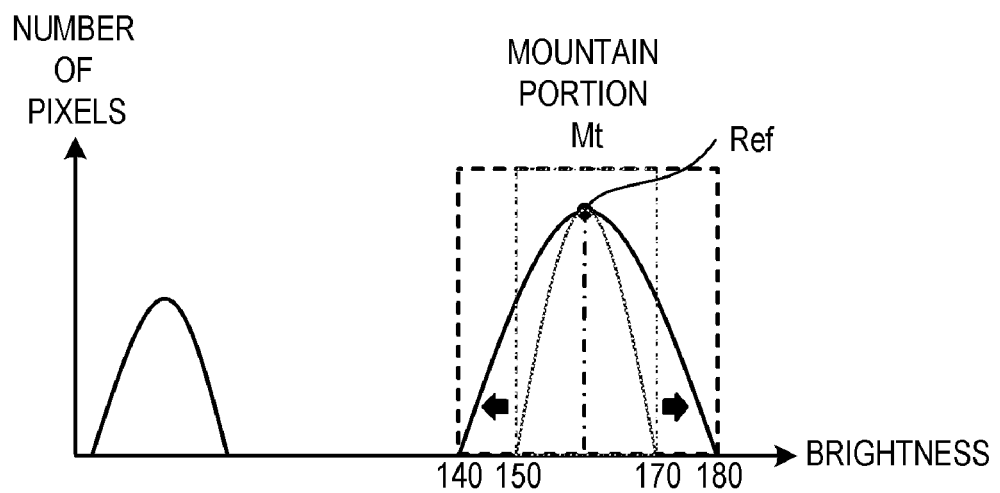
FIGS. 9A and 9B are diagrams for describing determination of a correction target value in accordance with the target brightness.

FIG. 9A is an example of expanding the histogram in the case where the target brightness TH is 200. The brightness range in the mountain portion Mt on the higher brightness side before the expansion is 150 to 170, and the width of the mountain portion Mt is 20 count. According to the lookup table in FIG. 6, the width of the mountain portion Mt after expansion is 40 count. Therefore, the image processing unit 108 expands the width of the mountain portion Mt to 40 count, while maintaining the brightness at the reference point Ref (160). The brightness range of the mountain portion Mt after the expansion is from 140 to 180.

Figure 9B:
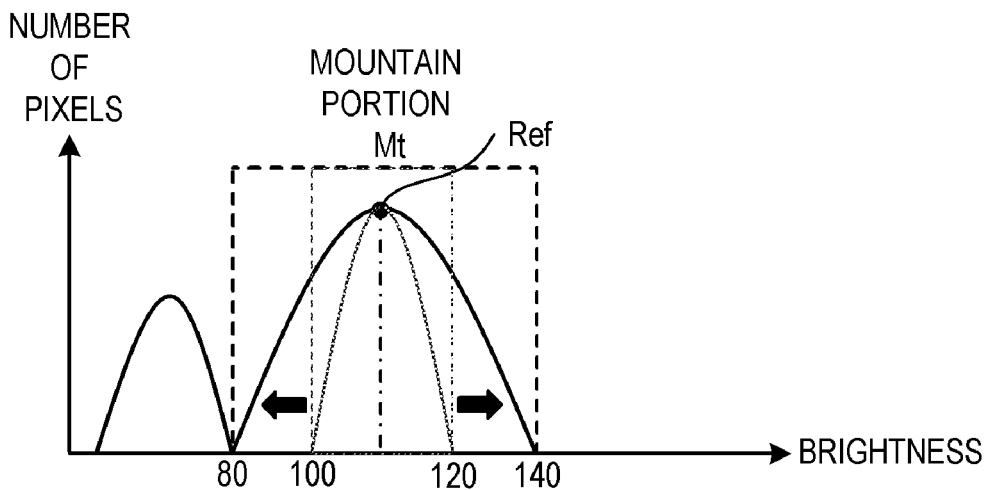

FIG. 9B is an example of expanding the histogram in the case where the target brightness TH is 150. The brightness range of the mountain portion Mt on the higher brightness side before the expansion is 100 to 120, and the width of the mountain portion Mt is 20 count, which is the same as the case where the target brightness TH is 200. According to the lookup table in FIG. 6, the width of the mountain portion Mt after the expansion is 40 count. In the case where the target brightness TH is 150, the gradation has been compressed more than the case where the target brightness TH is 200, hence the contrast may not be improved even if the mountain portion Mt is expanded to the same width as the case where the target brightness TH is 200. Therefore, in the example in FIG. 9B, the image processing unit 108 expands the width of the mountain portion Mt to count, while maintaining the brightness at the reference point Ref (110). The brightness range of the mountain portion Mt after the expansion is from 80 to 140.

It is assumed that S is the expansion ratio of the mountain portion Mt considering the target brightness TH, and W2 is the width of the mountain portion Mt before considering the target brightness TH. In this case, a width Ws of the mountain portion Mt of the histogram after considering the target brightness TH, which is the correction target value determined in step S403, is given by (Formula 2) below.

$$Ws = S \times W2 \quad \text{(Formula 2)}$$

In both examples in FIGS. 9A and 9B, W2 is 40 count. In the case where the target brightness TH is 200 in FIG. 9A, the expansion ratio S in (Formula 2) is S=1.0, and the width Ws of the mountain portion Mt after the expansion is Ws=1.0×40=40 count. In the case where the target brightness TH is 150 in FIG. 9B, the expansion ratio S in (Formula 2) is S=1.5, and the width Ws of the mountain portion Mt after the expansion is Ws=1.5×40=60 counts.

The expansion ratio S with respect to the target brightness TH is given by (Formula 3) below, where THmax is the maximum brightness of the target brightness that the user can specify, THmin is the minimum brightness thereof, Smax is the expansion ratio with respect to the maximum brightness THmax, and Smin is the expansion ratio with respect to the minimum brightness THmin.

$$S = Smin + (TH - THmin) \times (Smax - Smin) / (THmax - THmin) \quad \text{(Formula 3)}$$

The maximum brightness THmax, the minimum brightness THmin, the expansion ratio Smax, and the expansion ratio Smin may be values that are set in advance, or may be set or changed by the user, for example.

The image processing unit 108 may change the expansion ratio S based on the relationship between the target brightness TH and the reference point Ref which was determined and set in step S402. For example, in the case where the difference between the target brightness TH and the brightness at the reference point Ref is not more than a predetermined count (e.g. 10 count), the image processing unit 108 may decrease the degree of expanding the mountain portion Mt by bringing the expansion ratio S of (Formula 2) closer to 1.

Determination Method 2 for Correction Target Value

A determination method 2 for the correction target value is a method of changing an expansion ratio (degree of expansion) of the width of the mountain portion Mt considering the brightness of the main object. In the highlight-weighted photometry, it is difficult to determine whether the user wants to improve the contrast of the high brightness region. By combining the highlight-weighted photometry and the main object detection processing, the digital camera 100 can provide the gradation correction appropriate for the main object.

Figure 10:
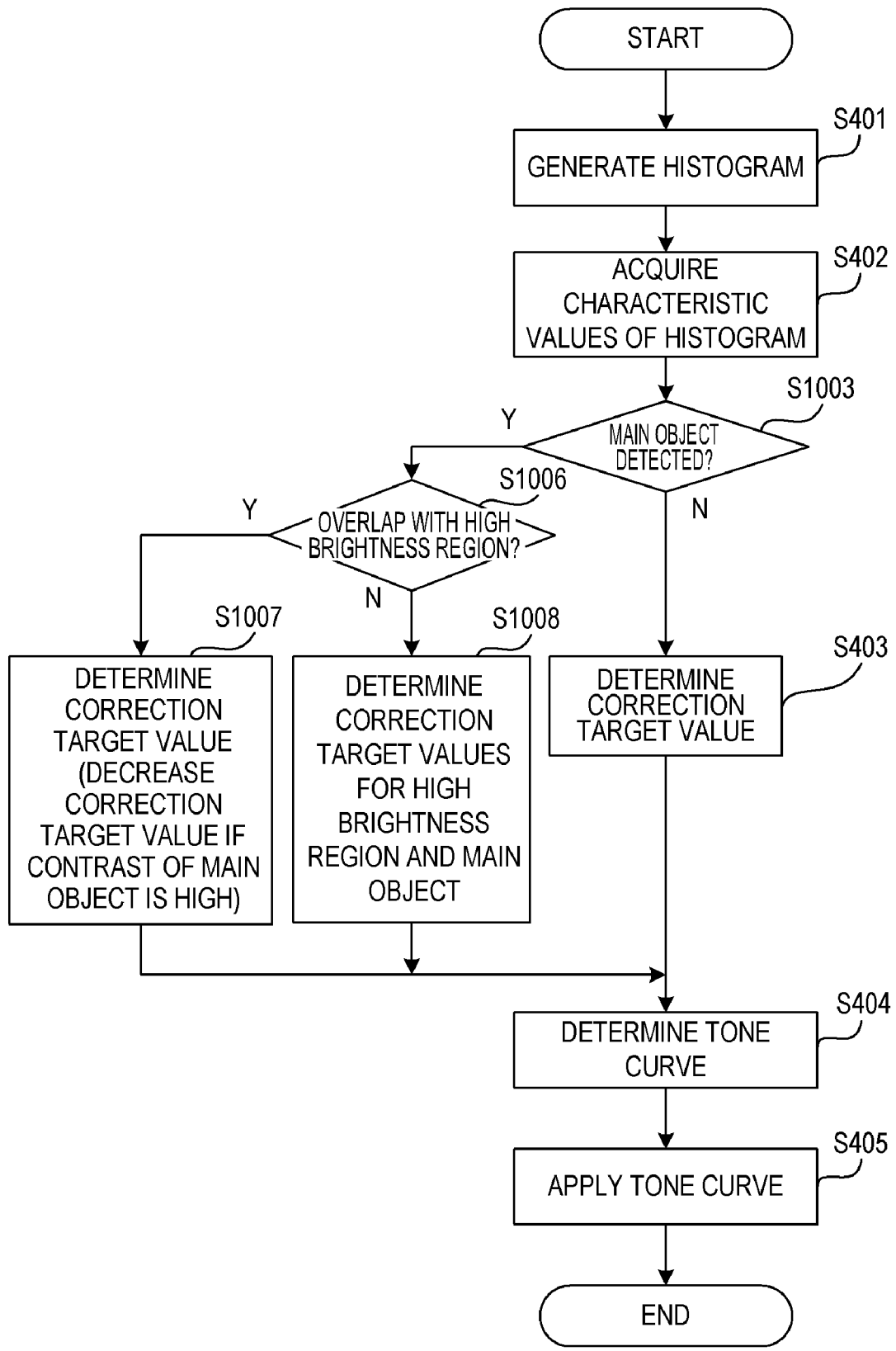
FIG. 10 is a flow chart exemplifying gradation correction processing considering main object brightness.

The processing of determining the correction target value considering the brightness of the main object, and performing the gradation correction based on the correction target value, will be described with reference to FIG. 10. FIG. 10 is a flow chart exemplifying the gradation correction processing considering the brightness of the main object. A same processing step as FIG. 4 is denoted with the same reference sign, and detailed description thereof is omitted. The image processing unit 108 generates a histogram of an image in step S401, and acquires the characteristic values of the histogram in step S402.

In step S1003, the image processing unit 108 determines whether a main object is detected in the image. The main object is a person, a face of a person, an animal, a plant, or the like. Processing advances to steps S1006 if the main object is detected, and processing advances to step S403 if the main object is not detected.

In step S1006, the image processing unit 108 determines whether a main object is detected in the high brightness region, that is, whether the brightness of the main object overlaps with the mountain portion Mt of the histogram on the higher brightness side. For example, it can be determined whether the brightness of the main object overlaps with the mountain portion Mt of the histogram on the higher brightness side by determining whether the difference between the brightness of the main object and the brightness at the peak or a reference point Ref of the mountain portion Mt is not more than ±5 count. The brightness of the main object is an average brightness, a maximum brightness, or the like in the region of the main object, for example. The image processing unit 108 determines that the brightness of the main object overlaps with the mountain portion Mt of the histogram on the higher brightness side if the difference is not more than ±5 count.

Another determination method is that the image processing unit 108 generates the histogram (brightness histogram) of the main object, and determines whether at least a predetermined ratio (e.g. 70%) of the portion of the histogram of the main object is included in the mountain portion Mt. If at least the predetermined ratio of the portion of the histogram of the main object is included in the mountain portion Mt, the image processing unit 108 determines that the histogram of the main object overlaps with the mountain portion Mt on the higher brightness side.

Processing advances to step S1007 if the histogram of the main object overlaps with the mountain portion Mt on the higher brightness side, and processing advances to step S1008 if the histogram of the main object does not overlap with the mountain portion Mt on the higher brightness side.

In step S1007, the image processing unit 108 determines the correction target value. The image processing unit 108 acquires the histogram of the main object, and determines the correction target value using the same method as step S403 if it is determined that the contrast of the main object is low. If it is determined that the contrast of the main object is high, on the other hand, the image processing unit 108 decreases the degree of the expansion by reducing the correction target value determined in step S403, or does not correct the width of the mountain portion Mt.

The contrast of the main object can be determined by a standard deviation of the histogram of the main object, for example. The image processing unit 108 sets a first threshold for the standard deviation, and determines that the contrast of the main object is low if the standard deviation is less than the first threshold. If it is determined that the contrast is low, the image processing unit 108 determines the correction target value by (Formula 1), and performs the gradation correction using the expanding width determination function Rate (W1) defined in step S403.

If the standard deviation is at least the first threshold, the image processing unit 108 determines that the contrast of the main object is high. If it is determined that the contrast of the main object is high, the image processing unit 108 decreases the degree of the expansion of the brightness range of the mountain portion Mt. Decreasing the degree of the expansion includes a case of not expanding the brightness range. The image processing unit 108 may determine the correction target value by (Formula 1) using Rate (W1), which is defined to approaches 1 as the difference between the standard deviation and the first threshold (standard deviation−first threshold) increases. If the standard deviation reaches a second threshold, which is larger than the first threshold, the image processing unit 108 determines that the contrast of the main object is sufficient, and sets the Rate (W1) to 1, so as to not perform the expansion.

In step S1007, the contrast of the main object may be determined not by the standard deviation, but by determining whether the width of the mountain portion in the histogram of the main object is not more than a predetermined threshold. For example, the image processing unit 108 may determine that the contrast is low if the width of the mountain portion of the histogram of the main object is not more than 20 count, and that contrast is high if this width is more than 20 count.

In step S1008, the histogram of the main object does not overlap with the mountain portion Mt on the high brightness side, hence the contrast of the main object may be low, and not as intended by the user. Therefore, in step S1008, the image processing unit 108 expands the brightness range of the high brightness region by the processing in step S403, and also expands the mountain portion of the brightness histogram of the main object.

The image processing unit 108 can determine the correction target value for the width of the mountain portion of the main object using the same method as step S403, and can expand the mountain portion of the main object thereby. The lookup table to define the width of the mountain portion after the expansion (width of the expanded brightness range) for the histogram of the main object, and the threshold to determine whether or not the mountain portion is expanded, may be set separately from the mountain portion Mt of the high brightness region. Further, the method for determining the start position and the end position of the mountain portion of the histogram of the main object may be different from that of the mountain portion Mt of the high brightness region.

Furthermore, in the histogram, (brightness of the end position of the mountain portion of the main object)≤ (brightness of the start position of the mountain portion Mt of the high brightness region) should be established so that the mountain portion Mt of the high brightness is not affected.

Figure 11A:
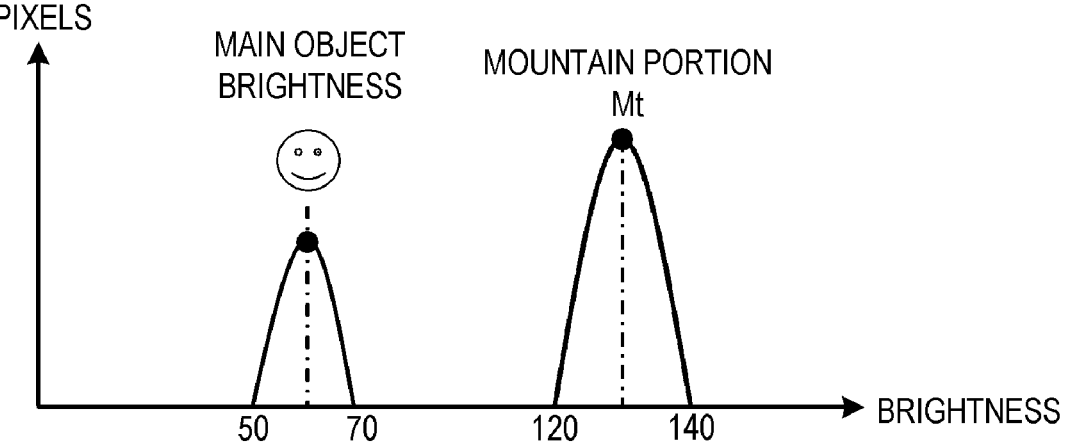
FIG. 11A is an example of a histogram before the expansion considering the main object brightness.
Figure 11B:
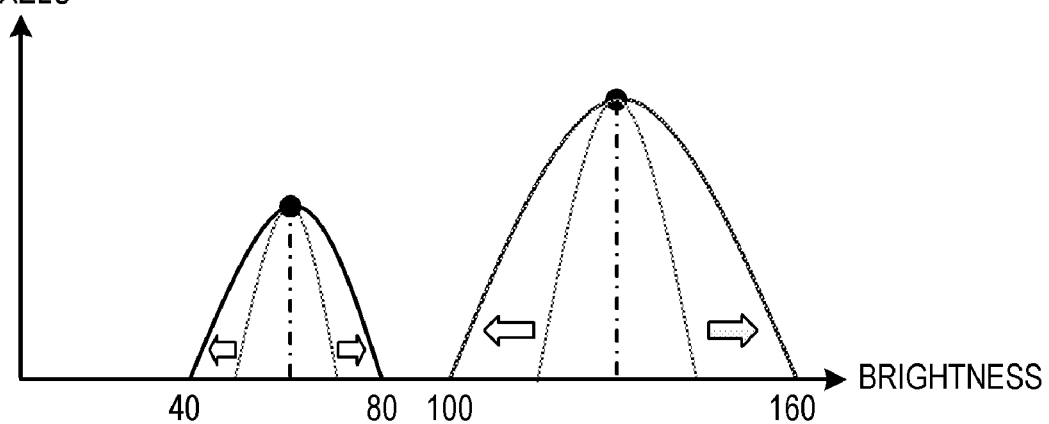
FIG. 11B is an example of a histogram after the expansion considering the main object brightness.

FIGS. 11A and 11B are examples of histograms before and after the expansion considering the brightness of the main object, in the case where the main object does not overlap with the high brightness region. FIG. 11A is a histogram before the expansion, and the brightness range of 50 to 70 is the mountain portion including the brightness of the main object. The brightness range of 120 to 140 is the mountain portion Mt of the high brightness region. FIG. 11B is a histogram after the expansion, and the mountain portion including the brightness of the main object has been expanded to the brightness range of 40 to 80. The mountain portion Mt of the high brightness region, on the other hand, has been expanded to the brightness range of 100 to 160 by the processing in step S403. Thus, the image processing unit 108 expands the histogram so as to maintain the relationship of (the brightness of the end position of the mountain portion of the main object=80)≤(the brightness of the start position of the mountain portion Mt of the high brightness region=100.

In a case where the brightness range of the mountain portion of the main object after the expansion in FIG. 11B is 70 to 110, for example, the relationship of (the brightness of the end position of the mountain portion of the main object=110)≤(the brightness of the start position of the mountain portion Mt of the high brightness region=100) is not established. In this case, the image processing unit 108 can decrease the degree of expansion by setting the brightness range of the mountain portion Mt of the high brightness region to 110 to 160. In the case where the brightness range of the mountain portion of the main object after the expansion overlaps with the brightness range of the mountain portion Mt of the high brightness region, the image processing unit 108 can correct the contrast of the main object appropriately by decreasing the degree of expansion of the mountain portion Mt of the high brightness region.

In the case where the main object is not detected in step S1003, that is, in step S403, the user does not have a object for which contrast is intentionally specified, and the contrast of the entire image may be low in the highlight-weighted photometry mode. In such a case, the image processing unit 108 can adjust the contrast of the image appropriately by determining the correction target value by the same method as the step S403 in FIG. 4.

According to the above embodiment, the digital camera 100 can improve the contrast of the high brightness region as intended by the user in the highlight-weighted photometry mode, even if the gradation is compressed more than the other photometry modes and the image is dark.

According to the present invention, contrast of an image in the high brightness region can be improved, while maintaining a luminescence intended by the user.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-113709, filed on Jul. 15, 2022, which is hereby incorporated by reference herein in its entirety.

What is claimed is:

1. An imaging apparatus comprising:
at least one memory and at least one processor which function as:
an exposure control unit configured to perform exposure control, so that representative brightness of a high brightness region of an image approaches a target brightness that is set by a user; and
a gradation correction unit configured to perform gradation correction to increase a contrast of the high brightness region, by expanding a brightness range of the high brightness region of the image which is captured after performing the exposure control, wherein
the gradation correction unit changes degree of the expansion of the brightness range of the high brightness region based on the target brightness,
wherein the gradation correction unit determines a width of a reference brightness range in accordance with a width of the brightness range of the high brightness region, and determines a width of the brightness range of the high brightness region after the expansion by multiplying the width of the reference brightness range by an expansion ratio in accordance with the target brightness.

2. The imaging apparatus according to claim 1, wherein the width of the reference brightness range is determined using a lookup table which corresponds the width of the brightness range of the high brightness region and the width of the reference brightness range, or a predetermined function to calculate the width of the reference brightness range corresponding to the width of the brightness range of the high brightness region.

3. The imaging apparatus according to claim 1, wherein the gradation correction unit performs the gradation correction so that a reference brightness in the brightness range of the high brightness region is not changed.

4. The imaging apparatus according to claim 3, wherein in a brightness histogram of the image, the reference brightness is a brightness at a maximum value of a mountain portion which corresponds to the high brightness region, a brightness at a center-of-gravity position of a region which corresponds to the mountain portion of the brightness histogram, or the representative brightness of the high brightness region.

5. The imaging apparatus according to claim 3, wherein the reference brightness is specified by the user.

6. The imaging apparatus according to claim 3, wherein in a brightness histogram of the image, a minimum brightness and a maximum brightness after expanding the brightness range of the high brightness region are determined so that the reference brightness is a midpoint.

7. The imaging apparatus according to claim 3, wherein in a brightness histogram of the image, a minimum brightness and a maximum brightness after expanding the brightness range of the high brightness region are determined so that a difference between the reference brightness and the minimum brightness and a difference between the reference brightness and the maximum brightness are different from each other by changing the degree of the expansion using different weighting values between a lower brightness side and a higher brightness side of the reference brightness.

8. The imaging apparatus according to claim 3, wherein in a case where a difference between the target brightness and the reference brightness is not more than a predetermined threshold, the gradation correction unit decreases the degree of the expansion of the brightness range of the high brightness region.

9. The imaging apparatus according to claim 1, wherein in a brightness histogram of the image, the gradation correction unit expands the brightness range of the high brightness region so that a maximum brightness after expanding the brightness range of the high brightness region does not exceed the target brightness.

10. The imaging apparatus according to claim 1, wherein in a case where a main object is detected in the high brightness region of the image,
the gradation correction unit performs the gradation correction in a case where a standard deviation of a brightness histogram of the main object is less than a threshold, and
decreases the degree of the expansion of the brightness range of the high brightness region in a case where the standard deviation of the brightness histogram of the main object is not less than the threshold.

11. The imaging apparatus according to claim 1, wherein the high brightness region is specified by the user.

12. The imaging apparatus according to claim 1, wherein the representative brightness is an average value, a maximum value, a minimum value, a median value, or a mode value of brightness of pixels included in the high brightness region.

13. An imaging apparatus comprising:
at least one memory and at least one processor which function as:
an exposure control unit configured to perform exposure control, so that representative brightness of a high brightness region of an image approaches a target brightness that is set by a user; and
a gradation correction unit configured to perform gradation correction to increase a contrast of the high brightness region, by expanding a brightness range of the high brightness region of the image which is captured after performing the exposure control, wherein
in a case where a main object is detected in a region of which brightness is lower than the high brightness region of the image, the gradation correction unit expands the brightness range of the high brightness region, and expands a brightness range of the region in which the main object is detected,
wherein the gradation correction unit determines a width of a brightness range of the region in which the main object is detected after the expansion, in accordance with a width of the brightness range of the region in which the main object is detected.

14. The imaging apparatus according to claim 13, wherein the gradation correction unit expands the brightness range of the high brightness region and the brightness range of the region in which the main object is detected, so that a brightness range of the high brightness region after the expansion and a brightness range of the region in which the main object is detected after the expansion do not overlap.

15. A control method of an imaging apparatus, comprising:
performing exposure control, so that representative brightness of a high brightness region of an image approaches a target brightness that is set by a user; and
performing gradation correction to increase a contrast of the high brightness region, by expanding a brightness range of the high brightness region of the image which is captured after performing the exposure control, wherein
degree of the expansion of the brightness range of the high brightness region is changed based on the target brightness,
wherein a width of a reference brightness range is determined in accordance with a width of the brightness range of the high brightness region, and a width of the brightness range of the high brightness region after the expansion is determined by multiplying the width of the reference brightness range by an expansion ratio in accordance with the target brightness.

16. A control method of an imaging apparatus, comprising:
performing exposure control, so that representative brightness of a high brightness region of an image approaches a target brightness that is set by a user; and
performing gradation correction to increase a contrast of the high brightness region, by expanding a brightness range of the high brightness region of the image which is captured after performing the exposure control, wherein
in a case where a main object is detected in a region of which brightness is lower than the high brightness region of the image, the brightness range of the high brightness region is expanded, and a brightness range of the region in which the main object is detected is expanded,
wherein a width of a brightness range of the region in which the main object is detected after the expansion, is determined in accordance with a width of the brightness range of the region in which the main object is detected.

17. A non-transitory computer readable medium that stores a program, wherein the program causes a computer to execute a control method of an imaging apparatus, the control method comprising:
performing exposure control, so that representative brightness of a high brightness region of an image approaches a target brightness that is set by a user; and
performing gradation correction to increase a contrast of the high brightness region, by expanding a brightness range of the high brightness region of the image which is captured after performing the exposure control, wherein
degree of the expansion of the brightness range of the high brightness region is changed based on the target brightness,
wherein a width of a reference brightness range is determined in accordance with a width of the brightness range of the high brightness region, and a width of the brightness range of the high brightness region after the expansion is determined by multiplying the width of the reference brightness range by an expansion ratio in accordance with the target brightness.

18. A non-transitory computer readable medium that stores a program, wherein the program causes a computer to execute a control method of an imaging apparatus, the control method comprising:

performing exposure control, so that representative brightness of a high brightness region of an image approaches a target brightness that is set by a user; and performing gradation correction to increase a contrast of the high brightness region, by expanding a brightness range of the high brightness region of the image which is captured after performing the exposure control, wherein in a case where a main object is detected in a region of which brightness is lower than the high brightness region of the image, the brightness range of the high brightness region is expanded, and a brightness range of the region in which the main object is detected is expanded, wherein a width of a brightness range of the region in which the main object is detected after the expansion, is determined in accordance with a width of the brightness range of the region in which the main object is detected.

\* \* \* \* \*